(12) United States Patent
Conrad et al.

(10) Patent No.: US 8,641,077 B2
(45) Date of Patent: Feb. 4, 2014

(54) STROLLER WITH A RECEIVING FRAME AND SUPPORT STRAPS FOR RECEIVING CAR SEATS

(75) Inventors: Derek Conrad, Riverside, CA (US); Jung Tsai Chen, Tainan (TW); Denny Tsai, Chino Hills, CA (US)

(73) Assignee: Baby Trend Inc., Ontario, CA (US)

( * ) Notice: Subject to any disclaimer, the term of this patent is extended or adjusted under 35 U.S.C. 154(b) by 116 days.

(21) Appl. No.: 13/438,752

(22) Filed: Apr. 3, 2012

(65) Prior Publication Data

US 2012/0193893 A1 Aug. 2, 2012

Related U.S. Application Data

(63) Continuation-in-part of application No. 12/900,961, filed on Oct. 8, 2010.

(51) Int. Cl.
 *B62B 1/00* (2006.01)
 *B62B 7/00* (2006.01)

(52) U.S. Cl.
 USPC ........... 280/642; 280/647; 280/644; 280/650; 280/47.38

(58) Field of Classification Search
 USPC ....................... 280/642, 647, 644, 650, 47.38
 See application file for complete search history.

(56) References Cited

U.S. PATENT DOCUMENTS

| | | | |
|---|---|---|---|
| 4,697,823 A | 10/1987 | Kassai | |
| 4,846,494 A | 7/1989 | Kassai | |
| 4,921,261 A | 5/1990 | Sadler, Jr. et al. | |
| 4,946,180 A | 8/1990 | Baer | |
| 5,121,940 A | 6/1992 | March | |
| D344,474 S | 2/1994 | Stoke | |
| D345,128 S | 3/1994 | Kassai | |
| 5,338,096 A | 8/1994 | Huang | |
| D352,923 S | 11/1994 | Kassai | |
| 5,454,575 A | 10/1995 | Del Buono | |
| 5,624,152 A | 4/1997 | Yoshie et al. | |
| 5,669,623 A | 9/1997 | Onishi | |
| 5,687,984 A | 11/1997 | Samuel | |
| 5,752,738 A | 5/1998 | Onishi et al. | |
| D430,076 S * | 8/2000 | Gehr | D12/129 |
| 6,189,914 B1 * | 2/2001 | Worth et al. | 280/642 |

(Continued)

OTHER PUBLICATIONS

Baby Trend Snap 'n Go Stroller—Single Snap http://www.toysrus.com/product/index.jsp?productId=2327597 5 pages, printed from the Internet on Oct. 6, 2011.

(Continued)

*Primary Examiner* — J. Allen Shriver, II
*Assistant Examiner* — James M Dolak
(74) *Attorney, Agent, or Firm* — Chen Yoshimura LLP (57) ABSTRACT

A baby stroller for receiving car seats is disclosed. The stroller has a frame structure including two car seat receiving frames spaced apart in a longitudinal direction. The two frames are located at different heights, allowing the two car seats placed thereon to overlap each in the longitudinal direction. On each car seat receiving frame, one or more support straps are attached to a front bar and a rear bar of the frame and located below the frame. The support straps are adjustable in length. When a car seat is rested on a car seat receiving frame, the bottom of the car seat is supported by the support straps. A safety strap is provided to secure each car seat to the frame structure. The stroller does not have a seat for seating a child.

3 Claims, 8 Drawing Sheets

(56) References Cited

U.S. PATENT DOCUMENTS

| | | | |
|---|---|---|---|
| 6,193,263 B1* | 2/2001 | Lin | 280/643 |
| 6,209,892 B1* | 4/2001 | Schaaf et al. | 280/33.993 |
| 6,267,406 B1 | 7/2001 | Huang | |
| D452,192 S | 12/2001 | Hartenstine et al. | |
| D455,679 S | 4/2002 | Tai et al. | |
| 6,409,205 B1 | 6/2002 | Bapst et al. | |
| 6,478,327 B1 | 11/2002 | Hartenstine et al. | |
| 6,702,316 B2 | 3/2004 | Hsia | |
| 6,938,906 B1 | 9/2005 | Black | |
| D510,549 S | 10/2005 | Kassai et al. | |
| 6,964,429 B2 | 11/2005 | Suga et al. | |
| 6,981,709 B2 | 1/2006 | Saint | |
| 7,017,937 B2* | 3/2006 | Williams | 280/643 |
| 7,040,694 B2 | 5/2006 | Sedlack | |
| 7,284,797 B2 | 10/2007 | Huang | |
| 7,445,230 B2 | 11/2008 | Kassai et al. | |
| 7,513,512 B2 | 4/2009 | Yoshie et al. | |
| D593,459 S | 6/2009 | Liao | |
| 7,614,640 B2 | 11/2009 | Dean et al. | |
| 7,770,911 B2* | 8/2010 | Dotsey et al. | 280/647 |
| 8,087,680 B2 | 1/2012 | Dotsey et al. | |
| 8,100,429 B2 | 1/2012 | Longenecker et al. | |
| 8,186,705 B2 | 5/2012 | Greger et al. | |
| 8,186,706 B2 | 5/2012 | Dotsey | |
| 8,205,894 B2 | 6/2012 | Li | |
| 8,282,119 B1 | 10/2012 | Caksa | |
| 8,328,208 B2* | 12/2012 | Chen | 280/47.38 |
| 8,388,016 B1* | 3/2013 | Powell et al. | 280/650 |
| 8,398,098 B2* | 3/2013 | Li | 280/47.38 |
| 8,414,012 B2* | 4/2013 | Chen et al. | 280/648 |
| 2003/0080536 A1 | 5/2003 | Hartenstine et al. | |
| 2004/0075229 A1 | 4/2004 | Huntley | |
| 2004/0124611 A1* | 7/2004 | Gong et al. | 280/642 |
| 2004/0173997 A1 | 9/2004 | Voll | |
| 2005/0127640 A1* | 6/2005 | Worth et al. | 280/642 |
| 2005/0242549 A1 | 11/2005 | Longenecker et al. | |
| 2009/0295128 A1 | 12/2009 | Nagelski et al. | |
| 2010/0038886 A1 | 2/2010 | Greger et al. | |
| 2010/0230933 A1* | 9/2010 | Dean et al. | 280/647 |

OTHER PUBLICATIONS

Jeep Universal Car Seat Carrier Stroller http://www.toysrus.com/product/index.jsp?productId=3955967 5 pages, printed from the Internet on Oct. 6, 2011.

Kolcraft Universal Infant Car Seat Carrier Stroller http://www.toysrus.com/product/index.jsp?productId=3398419 5 pages, printed from the Internet on Oct. 6, 2011.

Graco SnugRider Infant Car Seat Frame Stroller http://www.toysrus.com/product/index.jsp?productId=2266236 6 pages, printed from the Internet on Oct. 6, 2011.

International Search Report and Written Opinion in counterpart PCT application No. PCT/US2011/055481, dated Feb. 24, 2012.

* cited by examiner

STROLLER WITH A RECEIVING FRAME AND SUPPORT STRAPS FOR RECEIVING CAR SEATS

This application is a continuation-in-part application under 35 USC §120 of U.S. patent application Ser. No. 12/900961, filed Oct. 8, 2010, now pending, which is herein incorporated by reference in its entirety.

BACKGROUND OF THE INVENTION

1. Field of the Invention

This invention relates to a baby stroller, and in particular, it relates to a baby stroller with a receiving frame and support straps for receiving car seats.

2. Description of the Related Art

There have been strollers designed to receive infant car seats. For example, U.S. Pat. No. 6,409,205 describes "A Child's stroller including a latch mechanism for convenient folding and unfolding of the stroller, a bolster/tray that pivotally mounts to the upper handlebars of the stroller and is adapted for receiving an infant carrier or car seat for convenient transport of an infant passenger thereof in the stroller. The latch mechanism utilizes a latching handle that pivotally engages a spring loaded collar for disengagement of the stroller frame." U.S. Pat. No. 6,478,327 describes a stroller which has "an infant carrier securing mechanism that allows the infant car carrier to be attached to the stroller and provide at least two tilt positions." U.S. Pat. No. 7,040,694 describes an infant car seat that "can be attached to and detached from a car seat base and a stroller. The stroller can be used with or without the infant car seat. The infant car seat connects to the stroller frame through a bar that supports a tray at the front of the stroller. The tray slides out of the way for car seat attachment." U.S. Pat. No. 4,946,180 describes "a child support apparatus for use as a safety car seat, stroller, highchair and crib. The apparatus has telescoping legs with retractable wheels and pivotable handles which may be extended to function as a stroller or retracted and pivoted to become a safety car seat. The apparatus has a restraining tray assembly adapted to receive a safety harness to provide an auxiliary safety feature that may be utilized if the harness is not fastened or accidentally comes loose from its normal male-female mating mechanism. The trays associated with the restraining tray assembly are adjustable and rotatable to provide access to the unit's seat or as an extension for the apparatus' side arms when the unit is used as a crib. The retractable wheels are adapted with telescoping legs which may be extended to allow the unit to function as a highchair." U.S. Pat. Appl. Pub. Nos. 20090295128, 20040173997 and 20030080536 also describe a stroller that can receive a car seat.

Several stroller products on the market are designed to provide a frame for receiving an infant car seat only and cannot seat a child directly. Examples of such strollers include the Snap 'n Go Stroller by Baby Trend, the SnugRider Infant Car Seat Frame Stroller by Graco, the Universal Infant Car Seat Carrier Stroller by Kolcraft, and the Universal Car Seat Carrier Stroller by Jeep.

SUMMARY OF THE INVENTION

The present invention is directed to a baby stroller with a receiving frame and support straps for receiving one or more infant car seats.

An object of the present invention is to provide a stroller that can accommodate one or more car seats of various sizes and shapes.

Another object of the present invention is to provide such a stroller that has a simple structure and is easy to use.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a stroller which includes: a frame structure including first and second car seat receiving frames and a push handle, each of the first and second car seat receiving frames having four sides including a front bar and a back bar, the first and second car seat receiving frames being spaced apart in a longitudinal direction of the stroller; and one or more support straps attached to each of the first and second car seat receiving frames and located below the respective car seat receiving frame, wherein each support strap has one end attached to the front bar and another end attached to the back bar of the respective car seat receiving frame, and wherein each support strap is adjustable in length. The second car seat receiving frame may be located higher than the first car seat receiving frame.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
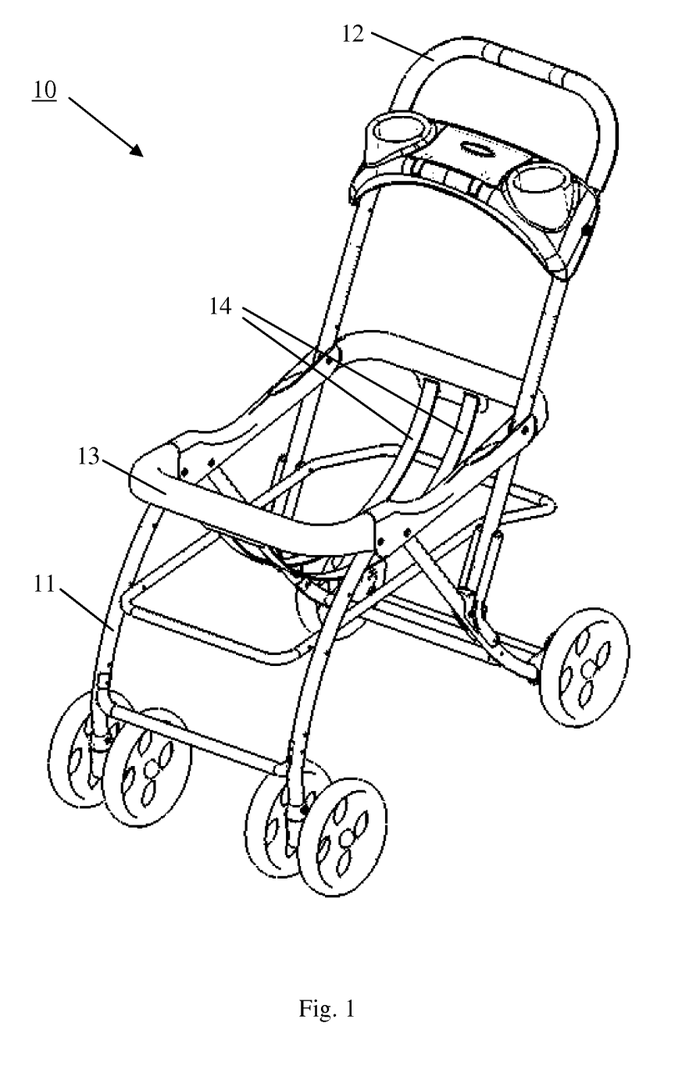
FIG. 1 is a perspective view of a baby stroller according to an embodiment of the present invention.
Figure 2:
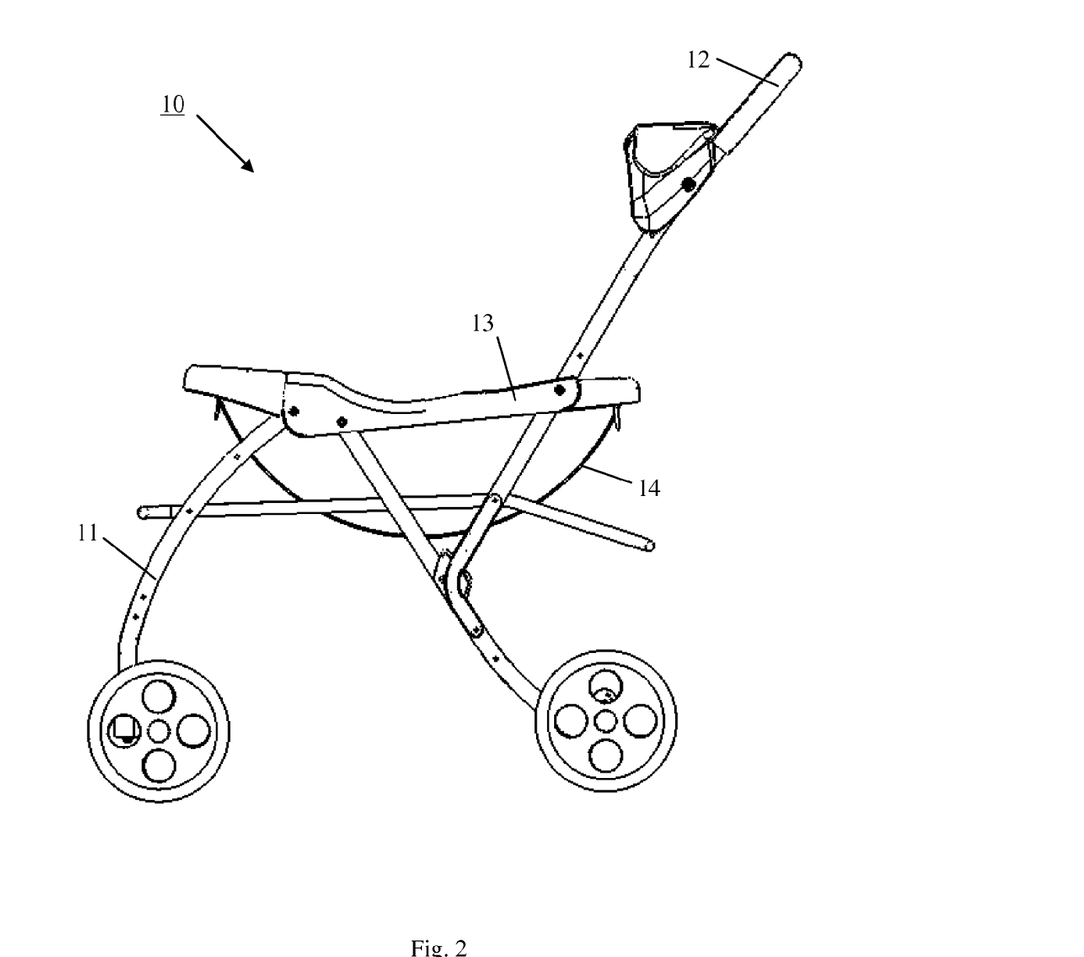
FIG. 2 is a right side view of the baby stroller of FIG. 1.

Referring to FIGS. 1 and 2, the stroller 10 according to an embodiment of the present invention has a frame structure 11 with wheels attached thereto. Optionally, the frame structure 11 is foldable. A part of the frame structure 11 forms a push handle 12, which extends upwardly from the rest of the frame structure, for pushing the stroller. Another part of the frame structure 11 forms a car seat receiving frame 13. In a preferred embodiment, the car seat receiving frame 13 is substantially rectangular in shape having four substantially horizontal bars (front, back, left side and right side).

A number of support straps 14 are attached to the frame structure 11 (preferably, to the receiving frame 13) and hang below the receiving frame 13. The lengths of the straps 14 are adjustable. In one embodiment, the ends of the straps 14 are threaded through multiple slits on the frame structure 11, so that a user can pull the ends to adjust the lengths of the straps. In an alternative embodiment, a buckle is provided in each strap 14 to adjust its length.

In the illustrated embodiment, two support straps 14 are attached to the front and back bars of the receiving frame and oriented in the longitudinal direction (i.e. the direction of forward movement of the stroller), and no strap is provided in the transverse direction (i.e. the direction perpendicular to the longitudinal direction). In alternative embodiments, one or more straps may be provided in the transverse direction. The stroller 10 does not have a seat hanging from the frame for seating a child.

Figure 3:
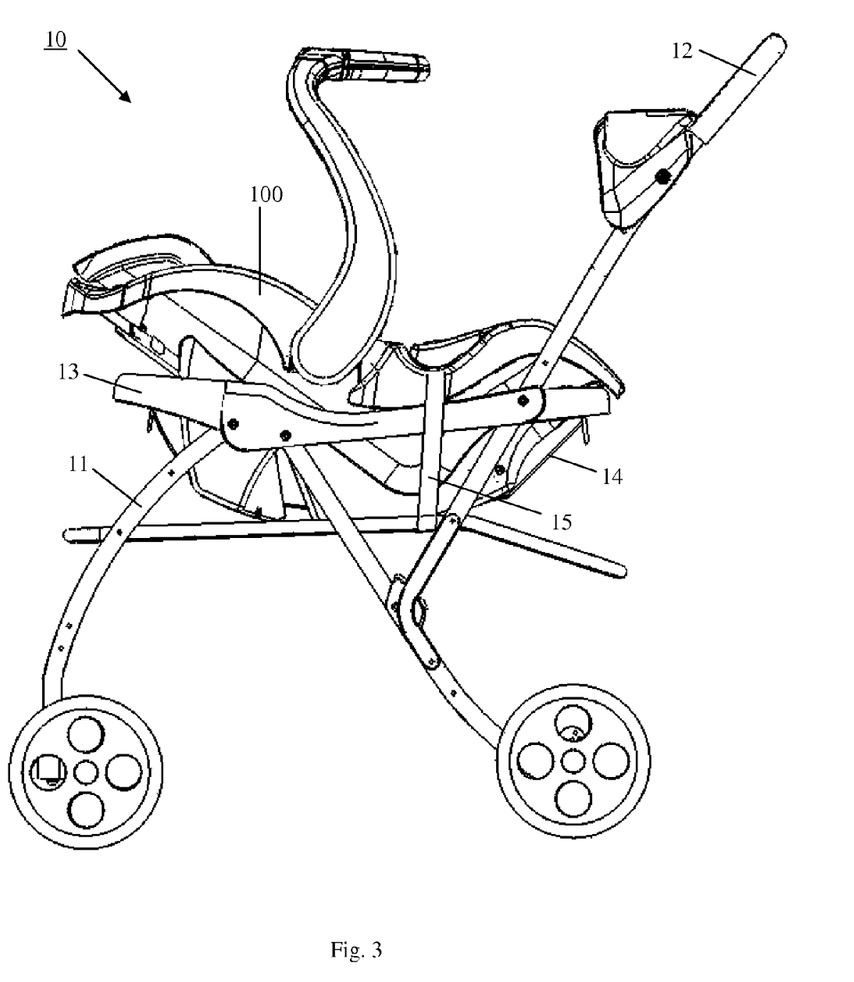
FIG. 3 is a right side view of the baby stroller of FIG. 1 with a car seat resting on the stroller.
Figure 4:
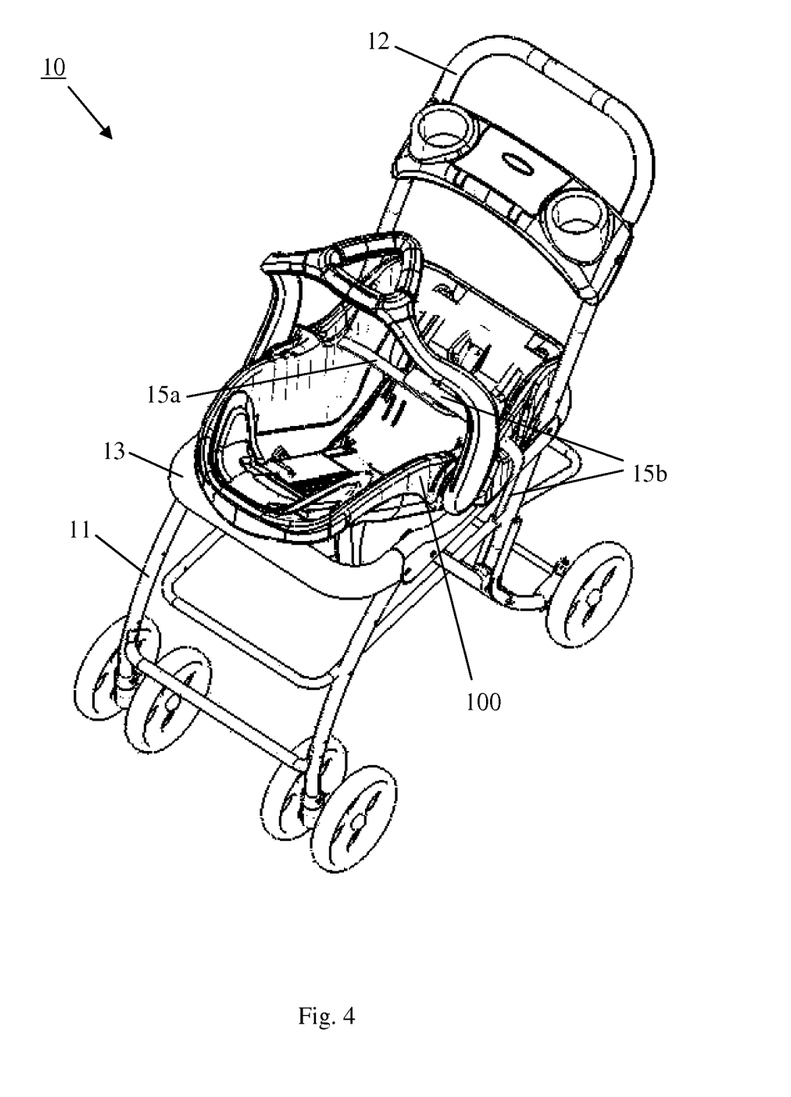
FIG. 4 is a perspective view of the baby stroller of FIG. 1 with a car seat resting on the stroller.

When a child car seat 100 is rested on the receiving frame 13, as shown in FIGS. 3 and 4, parts of the car seat 100 will contact the receiving frame 13, and parts of the car seat will be located below the receiving frame. Which parts of the car seat will contact the receiving frame 13 depends on the size and shape of the car seat; car seats of different sizes and shapes can be accommodated by the receiving frame. The lengths of the support straps 14 may be adjusted so that the straps conform to the shape of the bottom portion of the car seat 100 to provide support for the car seat. In other words, when the car seat 100 is rested on the receiving frame 13, the support straps 14 are in contact with the bottom surface of the car seat to provide support (see FIG. 3). The support straps 14 do not have any other structures, such as a storage basket, attached to it; its sole function is to provide support for the car seat.

As shown in FIGS. 3 and 4, a safety strap 15 is attached to the frame structure 11 and can be opened and closed to secure the car seat 100 to the frame structure. In one embodiment (see FIG. 4), the safety strap 15 has two straps parts 15a and 15b, each part being attached to the frame structure 11 at one end and having a linking mechanism (e.g., a buckle or Velcro™) at the other end for linking the two parts 15a and 15b to each other. In another embodiment (not shown), the safety strap 15 is a one part strap which is attached to the frame structure 11 at one end and has a attaching mechanism (e.g., a buckle or Velcro™) at the other end for attaching the safety strap to the frame structure. When the car seat 100 is rested on the receiving frame 13, the safety strap 15 may be placed over the car seat to lock the car seat to the frame structure 11 (see FIG. 4). The length of the safety strap 15 is preferably adjustable to securely lock the car seat 100 to the frame structure 11.

In the preferred embodiment, the car seat 100 merely rests on the receiving frame and the support straps 14 without being attached to or snapped into any parts of the receiving frame. This simplifies the structure of the stroller 10, and also makes it easier to place the car seat into the stroller and take it off of the stroller.

The frame structure 11 (including the pushing handle 12 and the receiving frame 13) may be made of any suitable material such as plastic, metal, etc. or a combination of such materials. The straps 14 and 15 may be made of any suitable flexible material such as fabric, plastic, etc.

Figure 5A:
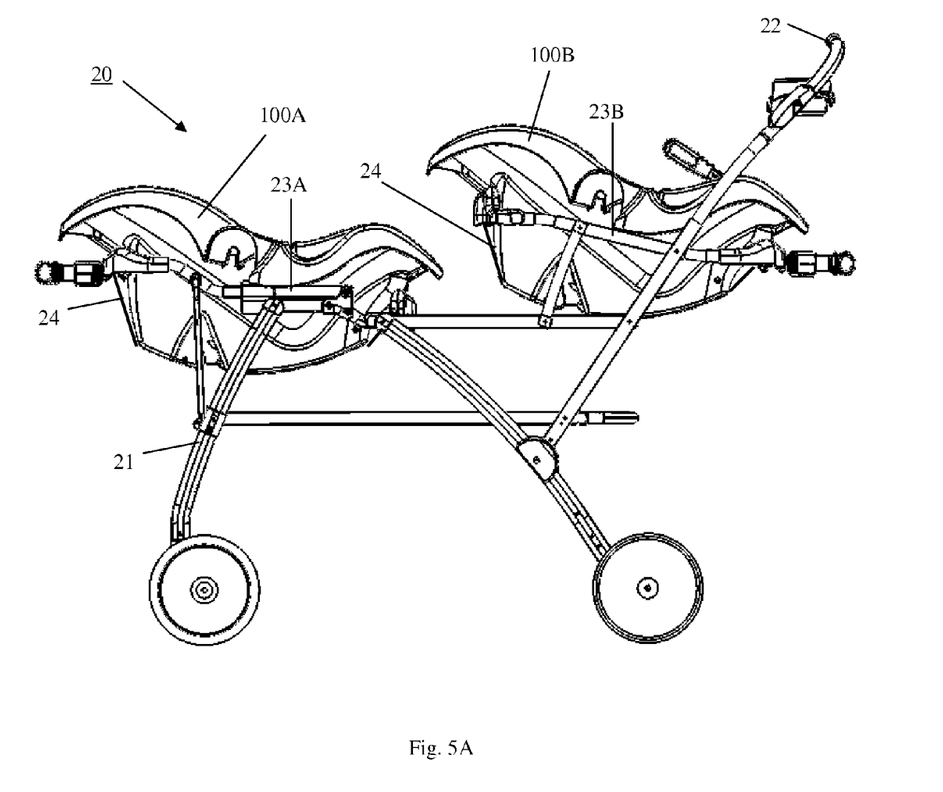
FIGS. 5A-5B and 6 are right side (with and without car seats) and perspective views, respectively, of a baby stroller according to another embodiment of the present invention.
Figure 5B:
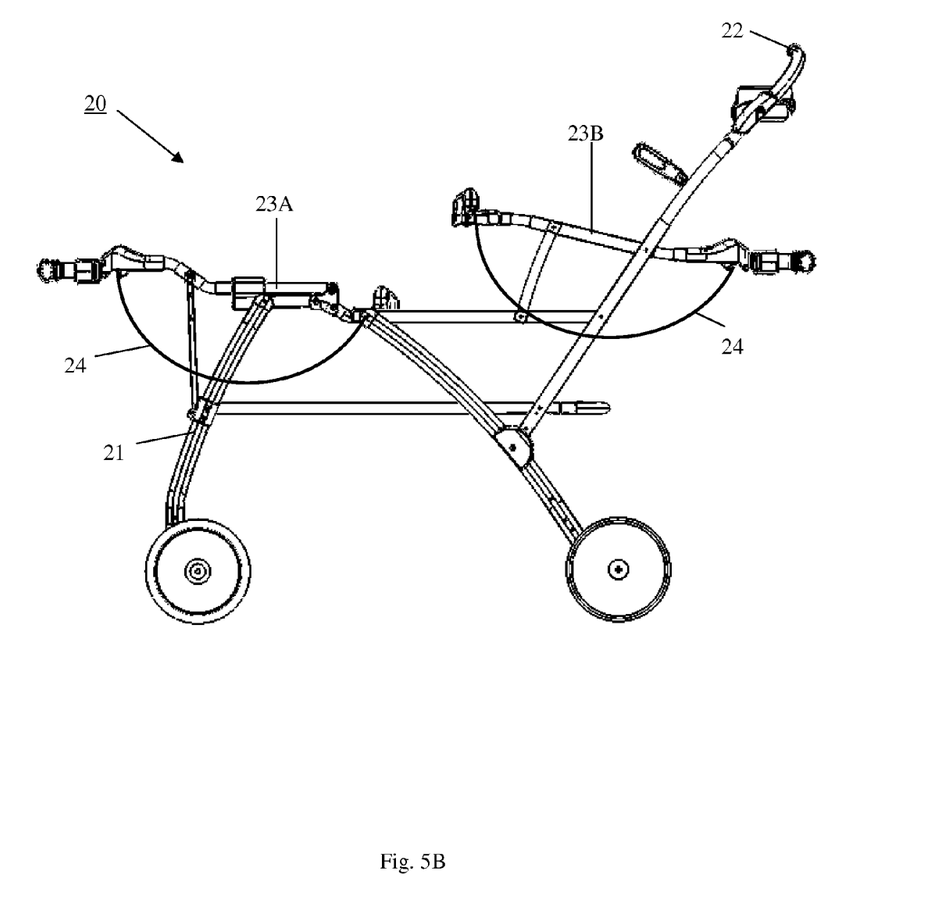
Figure 6:
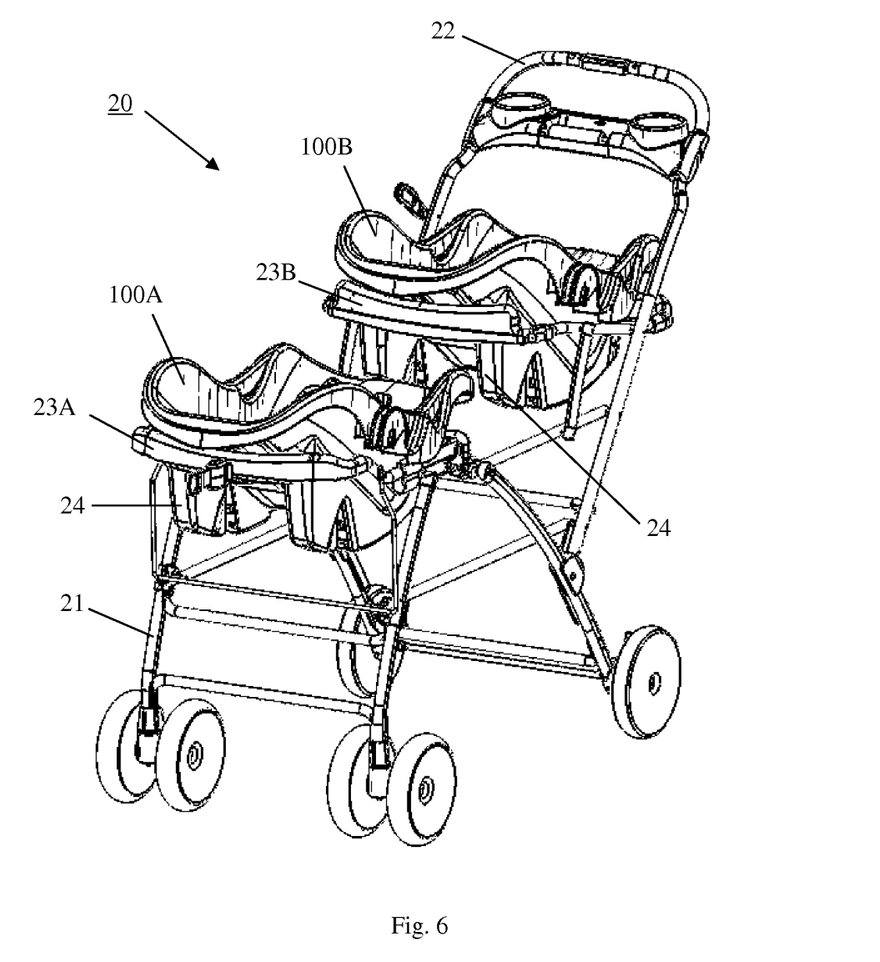

FIGS. 5A-5B and 6 show a baby stroller 20 according to another embodiment of the present invention. The stroller 20 has a frame structure 21, part of which forming a push handle 22. Two car seat receiving frames 23A and 23B are formed as parts of the frame structure 21. In one embodiment, each of the car seat receiving frames 23A and 23B is substantially rectangular in shape having four substantially horizontal bars (front, back, left side and right side). The two car seat receiving frames 23A and 23B are laterally spaced apart in a longitudinal direction of the stroller 20 such that one car seat receiving frame 23A is located near a front end of the stroller and the other car seat receiving frame 23B is located near a rear end of the stroller. Each car seat receiving frame 23A/23B is provided with adjustable support straps 24 similar to the support straps 14, and a safety strap similar to the safety strap 15, of the embodiment shown in FIGS. 1-4. (The safety straps are not shown in FIGS. 5A-5B and 6.)

In the embodiment shown in FIGS. 5A-5B and 6, the two car seat receiving frames 23A and 23B are located at different heights, with the rear frame 23B being located higher than the front frame 23A. Due to such elevation difference, when two car seats 100A and 100B are simultaneously placed in the two frames, the two car seats may overlap in the longitudinal direction, i.e., the front edge of the rear car seat 100B may be located closer to the front of the stroller than the rear edge of the front car seat 100A (see FIG. 5A). This allows the two frames 23A and 23B to be located closer to each other than they would be if they were at the same elevation, thereby achieving space saving in the longitudinal direction.

In one particular embodiment, the rear frame 23B is approximately 6 inches higher than the front frame 23A. Generally speaking, the relative elevation of the rear frame 23B should ensure a sufficient clearance between the overlapping portions of the two car seats 100A and 100B.

Figure 7:
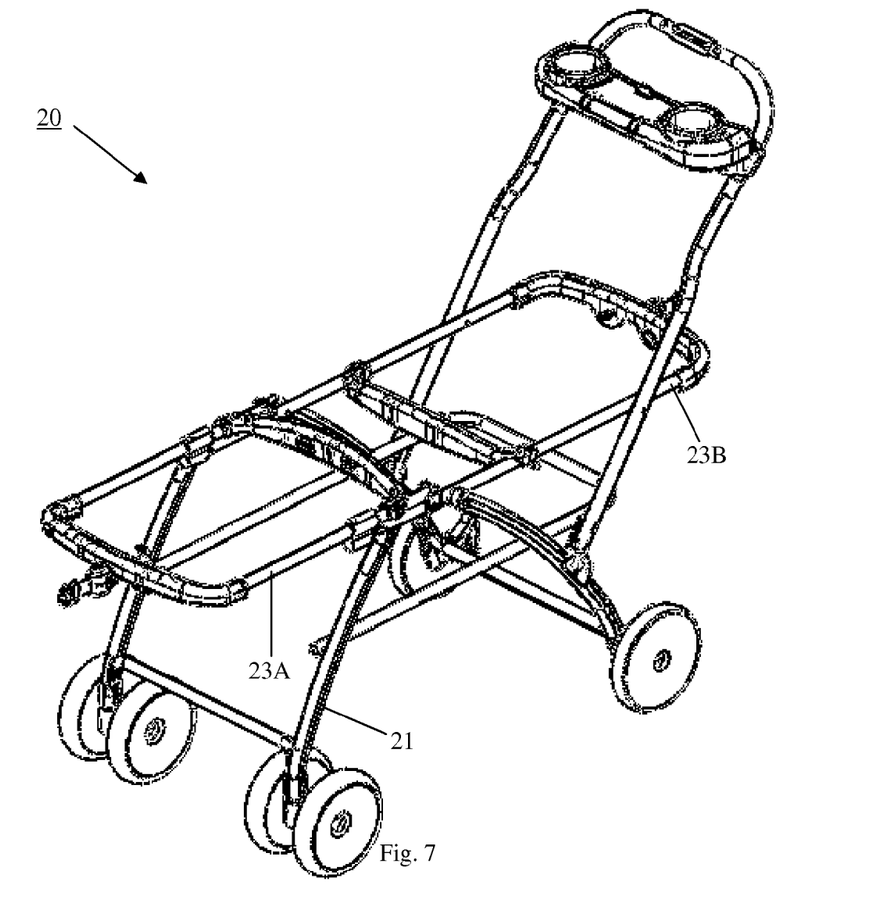
FIG. 7 is a perspective view of a baby stroller according to an alternative embodiment of the present invention.

Alternatively, although less preferred, the two car seat receiving frames 23A and 23B may be located at approximately the same height (see FIG. 7). As another alternative (not shown), the front car seat receiving frame may be located higher than the rear car seat receiving frame.

It will be apparent to those skilled in the art that various modification and variations can be made in the baby stroller of the present invention without departing from the spirit or scope of the invention. Thus, it is intended that the present invention cover modifications and variations that come within the scope of the appended claims and their equivalents.

What is claimed is:

1. A stroller comprising:
a frame structure including first and second car seat receiving frames and a push handle, each of the first and second car seat receiving frames having four sides including a front bar and a back bar, the first and second car seat receiving frames being spaced apart in a longitudinal direction of the stroller; and
one or more support straps attached to each of the first and second car seat receiving frames and located below the respective car seat receiving frame, wherein each support strap has one end attached to the front bar and another end attached to the back bar of the respective car seat receiving frame, and wherein each support strap end is threaded through multiple slits attached below the front and back bars of the respective car seat receiving frame thereby allowing each support strap to be adjustable in length.

2. The stroller of claim 1, further comprising two safety straps attached to the frame structure, each of the safety straps being closeable to secure a respective car seat to the frame structure.

3. The stroller of claim 1, wherein the second car seat receiving frame is located higher than the first car seat receiving frame.

* * * * *